United States Patent
Sickenius

(10) Patent No.: US 8,860,807 B2
(45) Date of Patent: Oct. 14, 2014

(54) REAL TIME PHYSICAL ASSET INVENTORY MANAGEMENT THROUGH TRIANGULATION OF VIDEO DATA CAPTURE EVENT DETECTION AND DATABASE INTERROGATION

(75) Inventor: Louis S. Sickenius, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/449,947

(22) Filed: Apr. 18, 2012

(65) Prior Publication Data

US 2013/0113626 A1    May 9, 2013

Related U.S. Application Data

(63) Continuation of application No. 13/292,851, filed on Nov. 9, 2011.

(51) Int. Cl.
| | |
|---|---|
| *H04N 7/18* | (2006.01) |
| *G08B 13/196* | (2006.01) |
| *H04N 5/76* | (2006.01) |
| *H04N 5/77* | (2006.01) |
| *H04N 5/911* | (2006.01) |

(52) U.S. Cl.
CPC ............ *G08B 13/19606* (2013.01); *H04N 7/18* (2013.01); *H04N 7/181* (2013.01); *H04N 5/76* (2013.01); *H04N 5/77* (2013.01); *H04N 5/911* (2013.01); *G08B 13/19697* (2013.01)
USPC ........... 348/143; 348/150; 348/152; 348/155; 348/161

(58) Field of Classification Search
CPC ........... H04N 7/18; H04N 7/181; H04N 5/76; H04N 5/77; H04N 5/911
USPC .......................... 348/143, 150, 152, 155, 161
See application file for complete search history.

(56) References Cited

U.S. PATENT DOCUMENTS

| | | | | |
|---|---|---|---|---|
| 4,682,249 | A | 7/1987 | Andreasson | |
| 6,049,281 | A * | 4/2000 | Osterweil | 340/573.4 |
| 7,868,919 | B2 * | 1/2011 | Flannery | 348/211.8 |
| 8,160,303 | B2 * | 4/2012 | Lee | 382/107 |
| 2003/0216969 | A1 | 11/2003 | Bauer et al. | |
| 2005/0132414 | A1 * | 6/2005 | Bentley et al. | 725/105 |

(Continued)

OTHER PUBLICATIONS

Sickenius, "Real Time Physical Asset Inventory Management Through Triangulation of Video Data Capture Event Detection and Database Interrogation," filed Nov. 9, 2011, U.S. Appl. No. 13/292,851, 32 pages.

*Primary Examiner* — Shawn An
(74) *Attorney, Agent, or Firm* — Yee & Associates, P.C.; Parashos T. Kalaitzis

(57) ABSTRACT

A surveillance system monitors a monitored vessel containing hidden resources. When activity is determined as occurring within a vicinity of the monitored vessel, an alert is issued to monitoring personnel. Personnel can then obtain a current image of the hidden resource within the monitored vessel. Upon receiving the current image of the hidden resource, a previous image of the hidden resource is retrieved and discrepancies between the current image and the previous image are determined. Responsive to determining that discrepancies between the current image and the previous image exist, an alarm is issued to personnel to further investigate the discrepancy.

7 Claims, 4 Drawing Sheets

(56) References Cited

U.S. PATENT DOCUMENTS

| | | |
|---|---|---|
| 2006/0171453 A1 | 8/2006 | Rohlfing et al. |
| 2006/0173756 A1 | 8/2006 | Benight |
| 2008/0094470 A1* | 4/2008 | Wong et al. .................. 348/143 |
| 2008/0183637 A1 | 7/2008 | Cramer et al. |
| 2008/0246613 A1 | 10/2008 | Linstrom et al. |
| 2009/0316400 A1 | 12/2009 | Pratt |
| 2010/0046791 A1 | 2/2010 | Glickman et al. |
| 2010/0138037 A1 | 6/2010 | Adelberg et al. |

* cited by examiner

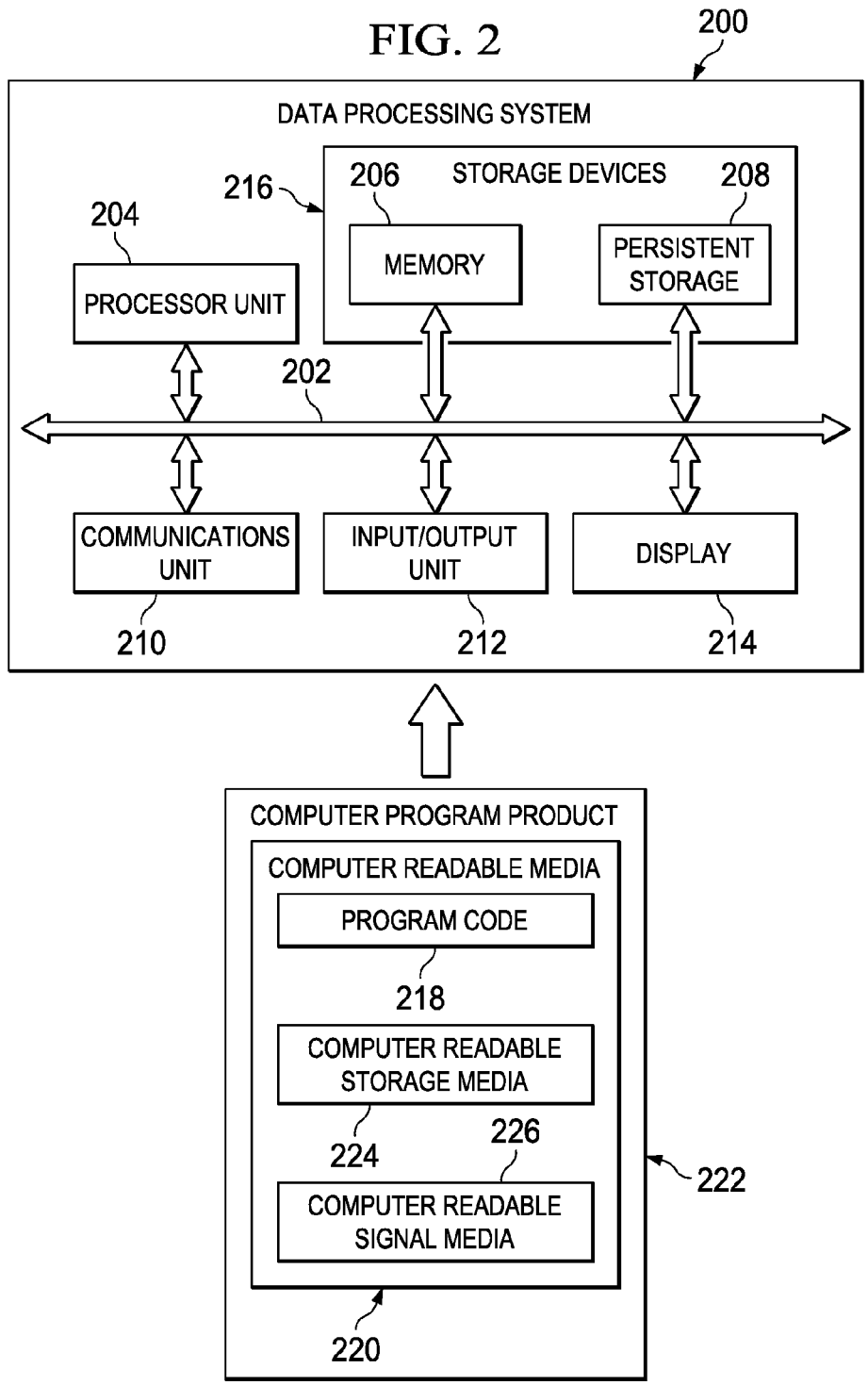

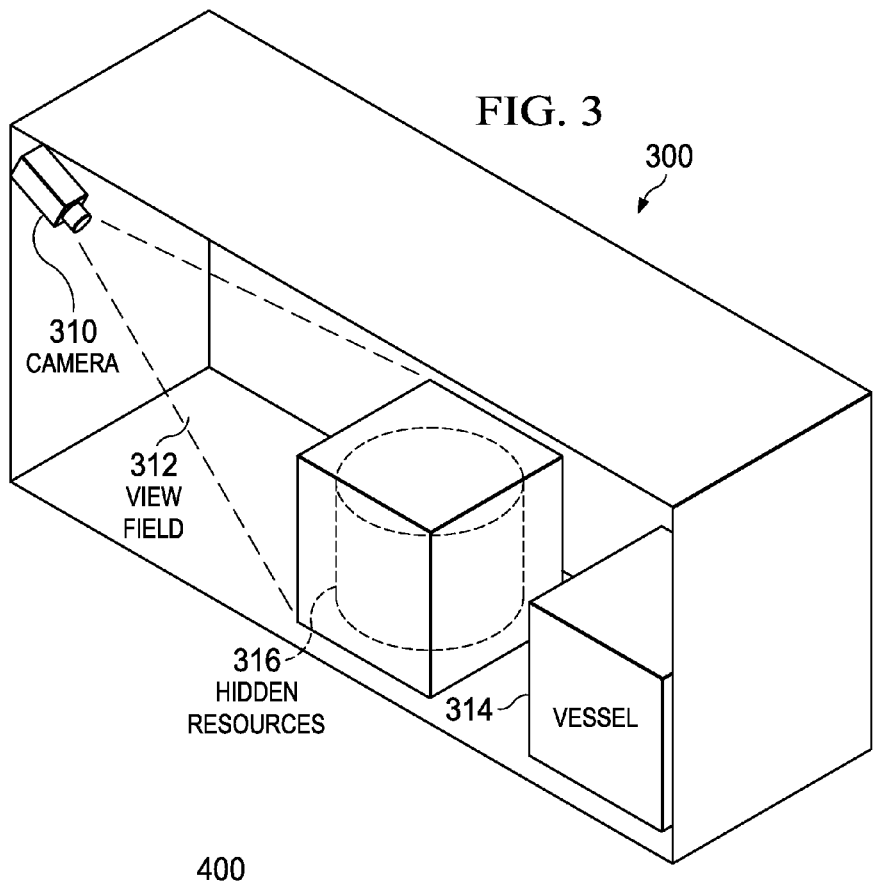
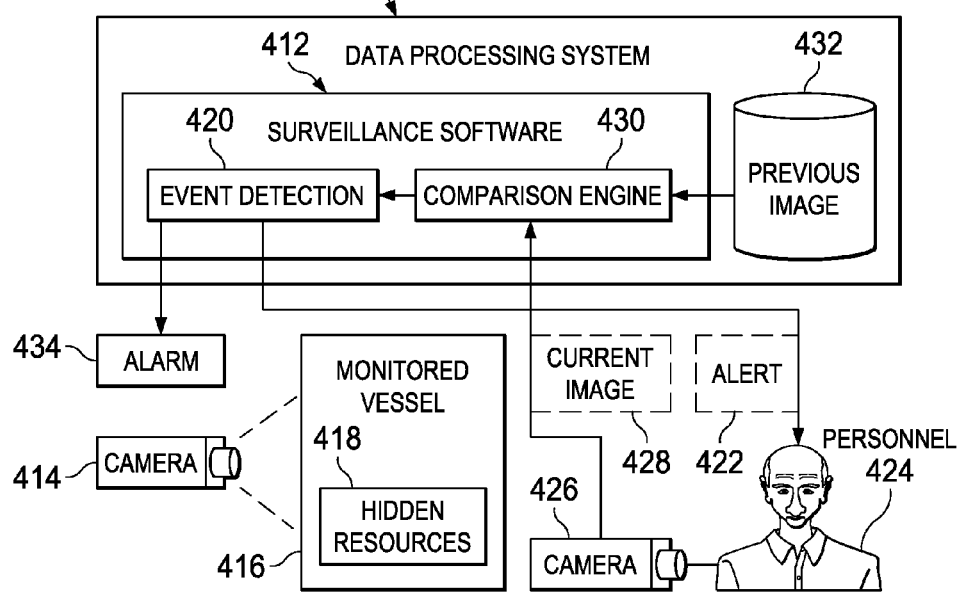

REAL TIME PHYSICAL ASSET INVENTORY MANAGEMENT THROUGH TRIANGULATION OF VIDEO DATA CAPTURE EVENT DETECTION AND DATABASE INTERROGATION

This application is a continuation of application Ser. No. 13/292,851, filed Nov. 9, 2011, status pending.

BACKGROUND

1. Field

The disclosure relates generally to a computer implemented method, a computer system, and a computer program product. More specifically, the disclosure relates generally to a computer implemented method, a computer system, and a computer program product for monitoring hidden assets.

2. Description of the Related Art

Traditional asset management solutions rely on the practice of taking inventory of the assets during certain intervals in time, often based on prescribed dates on the calendar. With this traditional asset management model, it can be difficult to recover lost assets due to the time elapsed between the asset loss event and asset loss detection.

Radio frequency identification (RFID) tagging can provide some level of real time asset inventory monitoring. However, radio frequency identification tagging technology has technical limitations and can be costly to implement and maintain. It is often not practical to tag some assets with RFID due to real estate limitations on the asset itself for the RFID tag to be located. Further, while RFID can provide some automation, human intervention is still required in response to a breach in inventory security.

While video surveillance technology can be applied to asset management applications, surveillance can only monitor assets within the purview of the camera(s).

SUMMARY

According to one embodiment of the present invention, a computer implemented method, a computer program product, and a data processing system provide a method for monitoring resources. A monitored vessel containing hidden resources is monitored. When activity is determined as occurring within a vicinity of the monitored vessel, an alert is issued to monitoring personnel. Personnel can then obtain a current image of the hidden resource within the monitored vessel. Upon receiving the current image of the hidden resource, a previous image of the hidden resource is retrieved and discrepancies between the current image and the previous image are determined. Responsive to determining that discrepancies between the current image and the previous image exist, an alarm is issued to personnel to further investigate the discrepancy.

BRIEF DESCRIPTION OF THE SEVERAL VIEWS OF THE DRAWINGS

FIG. 2 is an illustration of a data processing system depicted in accordance with an advantageous embodiment;

FIG. 3 is a surveillance system shown according to the prior art;

FIG. 4 is a dataflow shown for a surveillance system according to an illustrative embodiment;

DETAILED DESCRIPTION

Figure 1:
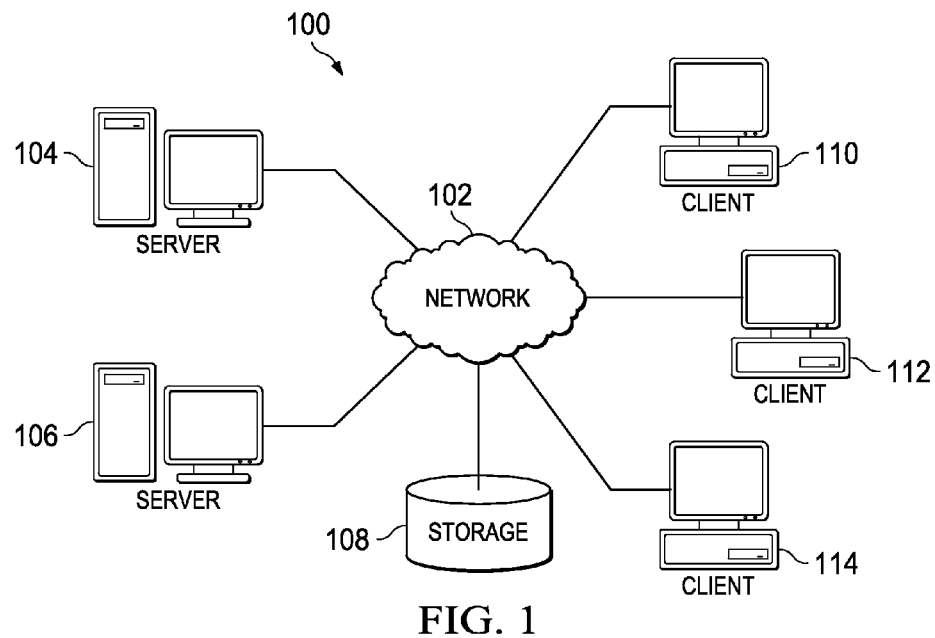
FIG. 1 depicts a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an advantageous embodiment. Data processing system 200 can be, for example, one of server computer 104, server computer 106, or client computers 110, 112, and 114 of FIG. 1. Data processing system 200 may be used to implement a surveillance system for monitoring hidden assets. In this illustrative example, data processing system 200 includes communications framework 202, which provides communications between processor unit 204, memory 206, persistent storage 208, communications unit 210, input/output (I/O) unit 212, and display 214. In these examples, communications frame work 202 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

Referring now to FIG. 3, a surveillance system is shown according to the prior art.

Surveillance system 300 includes a camera 310, such as camera 414 of FIG. 4. Camera 310 is capable of providing real time video and image captures to a surveillance monitoring system.

View field 312 is focused on vessel 314. Vessel 314 is a container that contains hidden resources 316. Hidden resources 316 are materials, documents, or other property that is not readily visible within view field 312. For example, vessel 314 can be, but is not limited to, a cabinet, a desk, a safe, a closet, a room, and a computer rack. Vessel 314 can also be any other container, the contents of which are obscured from view field 312 of camera 310.

The illustrative embodiment described herein establishes a virtual internal view of vessels, such as vessel 314. A catalog is established to monitor sensitive assets that are within range of a surveillance camera, such as camera 310, but are physically out of view of the camera.

The illustrative embodiment establishes a virtual view of sensitive assets by registering captured images of hidden resources within a database. The captured images can be registered by manually documenting the contents of a vessel, such as vessel 314, with a photo or image capture of the hidden resources within the vessel. The image of the hidden resources is then stored within a database and associated with the vessel that contains the internal contents.

An established surveillance system would alert security personnel to activity occurring in the vicinity of a monitored vessel. Security personnel could then manually obtain a subsequent captured image of the sensitive assets. A comparison engine then compares the previous captured image of the hidden resources stored within the database to the subsequent captured image of the hidden resources. Discrepancies between the previous captured image of the hidden resources stored within the database and the subsequent captured image of the hidden resources trigger an alert to the security personnel that contents of the vessel may have been compromised. Security personnel could then detain persons that were monitored in the vicinity of the monitored vessel for further questioning or searching. This search process would target the specific missing items as identified when comparing current and prior images for the contents of the vessel.

Thus, the illustrative embodiment herein provides a computer implemented method, a computer program product, and a data processing system provide a method for monitoring resources. A monitored vessel containing hidden resources is monitored. When activity is determined as occurring within a vicinity of the monitored vessel, an alert is issued to monitoring personnel. Personnel can then obtain a current image of the hidden resource within the monitored vessel. Upon receiving the current image of the hidden resource, a previous image of the hidden resource is retrieved and discrepancies between the current image and the previous image are determined. Responsive to determining that discrepancies between the current image and the previous image exist, an alarm is issued to personnel to further investigate the discrepancy.

Referring now to FIG. 4, a dataflow is shown for a surveillance system according to an illustrative embodiment.

Surveillance system 400 includes data processing system 410. Data processing system is one or more data processing systems, such as one or more of server computer 104, server computer 106, or client computers 110, 112, and 114 of FIG. 1. Data processing system 410 executes surveillance software 412. Surveillance software 412 is a software component, executing on data processing system 410, for monitoring resources, including hidden resources, such as hidden resources 316 of FIG. 3.

Surveillance system 400 includes camera 414. Camera 414 is a camera, such as camera 310 of FIG. 3. Camera 414 is capable of providing real time video and image captures of monitored vessel 416 to event detection 420 of surveillance software 412.

Monitored vessel 416 is a container, such as vessel 314 that contains hidden resources 418. Hidden resources 418 are materials, documents, or other property that is not readily visible within a view field of camera 414, and that are located within monitored vessel 416. Hidden resources 418 can be, for example, hidden resources 316 of FIG. 3. Monitored vessel 416 can be, but is not limited to, a cabinet, a desk, a safe, a closet, a room, and a computer rack. Monitored vessel 416 can also be any other container, the contents of which are obscured from a view field of camera 414.

Event detection 420 is a software module or component of surveillance software 412. Event detection 420 is capable of detecting activity occurring in the vicinity of a monitored vessel based on either real time video, image captures, or combinations thereof, provided by camera 414. If activity is detected to be occurring in the vicinity of a monitored vessel, event detection 420 can send alert 422 to personnel 424.

Alert 422 is a message, notification, alarm, or other notice to personnel 424 that event detection 420 has detected activity occurring in the vicinity of monitored vessel 416. Alert 422 can be, for example, an email, a visual alarm, an audio alarm, a pop up, a text based message, or any other form of notification provided to personnel 424.

Personnel 424 is a person tasked with monitoring security of monitored vessel 416 and hidden resources 418 housed therein. Upon receiving alert 422, personnel 424 can utilize camera 426 to provide current image 428 of hidden resources 418 to comparison engine 430 for evaluation of possible absconding of hidden resource 418 from monitored vessel 416.

Camera 426 is a camera, such as camera 310 of FIG. 3. Camera 414 is capable of providing image captures of hidden resources 418 within monitored vessel 416 and comparison engine 430 for evaluation of possible absconding of hidden resources 418 from monitored vessel 416. In one illustrative embodiment, camera 426 is a handheld camera that can be carried by personnel 424 to a physical location of monitored vessel 416 in order to obtain current image 428 of hidden resources 418 within monitored vessel 416.

Current image 428 is an image of hidden resources 418 taken by personnel 424 with camera 426 in response to receiving alert 422. Current image 428 is an image of the contents of monitored vessel 416 taken after event detection 420 has detected activity occurring in the vicinity of monitored vessel 416. Personnel 424 loads current image 428 into comparison engine 430.

Comparison engine 430 is a software component that digitally compares current image 428 to previous image 432 to determine discrepancies between the two images. Previous image 432 is an image of the contents of monitored vessel 416 taken prior to event detection 420 detecting the activity occurring in the vicinity of monitored vessel 416.

In one illustrative embodiment, comparison engine 430 can adjust the rotational alignment, as well as a magnification level of current image 428 to more closely align current image 428 to previous image 432 before a comparison is made. After aligning current image 428 with previous image 432, comparison engine 430 can then perform a per pixel comparison of current image 428 to previous image 432 to determine discrepancies between the separate images.

In one illustrative embodiment, comparison engine 430 can determine whether discrepancies between current image 428 and previous image 432 are innocuous discrepancies or invasive discrepancies. Innocuous discrepancies are those discrepancies between current image 428 and previous image 432 due to the differences in pixilation of the various objects within the two images. For example, after aligning current image 428 with previous image 432, discrepancies between the two images may be present simply due to the location at which personnel 424 was located when current image 428 was obtained. Similarly, various objects depicted within the current image 428 and previous image 432 may be provided with different levels of resolution, leading to differences in the per pixel comparison between current image 428 with previous image 432. Discrepancies between current image 428 and previous image 432 due to resolution and alignment of the various objects within current image 428 and previous image 432 are classified as innocuous discrepancies.

In contrast to innocuous discrepancies, after aligning current image 428 with previous image 432, discrepancies between the two images may exist due to objects within one of current image 428 and previous image 432 that are not depicted in the other one of current image 428 and previous image 432. Discrepancies due to these non-corresponding objects are classified as invasive discrepancies.

Upon determination of an invasive discrepancy, event detection 420 issues alarm 434. Alarm 434 is a message, notification, alarm, or other notice to personnel 424 that comparison engine 430 has detected as an invasive discrepancy between current image 428 and previous image 432. Alarm 434 can be, for example, an email, a visual alarm, an audio alarm, a pop up, a text based message, or any other form of notification provided to personnel 424.

Upon receipt of alarm 434, personnel 424 can further investigate the invasive discrepancy. The further investigation can include searching monitored vessel 416, as well as searching, detaining, or questioning any personnel connected with the activity detected as occurring in the vicinity of monitored vessel 416. The further investigation may also include notifying any law enforcement personnel, if the invasive discrepancy is identified as a theft of property from within monitored vessel 416.

Figure 5:
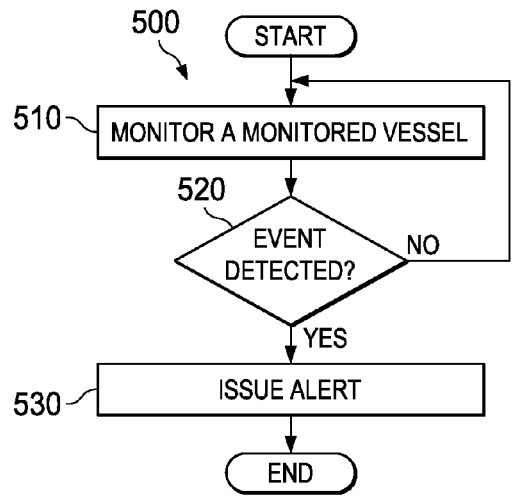
FIG. 5 is a flowchart of processing steps for providing alerts of activity occurring in the vicinity of a monitored vessel shown according to an illustrative embodiment.

Referring now to FIG. 5, a flowchart of processing steps for providing alerts of activity occurring in the vicinity of a monitored vessel is shown according to an illustrative embodiment. Process 500 is a software process, occurring on a software component, such as surveillance system 400 of FIG. 4.

Process 500 begins by monitoring a monitored vessel (step 510). The monitored vessel can be, for example, monitored vessel 416 of FIG. 4. The monitored vessel contains hidden resources such as materials, documents, or other properties that are not readily visible within view field of a camera used to monitor the monitored vessel. The monitored vessel can be, but is not limited to, a cabinet, a desk, a safe, a closet, a room, and a computer rack. The monitored vessel can also be any other container, the contents of which are obscured from a view field of the camera used to monitor the monitored vessel.

Process 500 then determines whether an event is detected (step 520). An event can include activity occurring in the vicinity of the monitored vessel based on either real time video, image captures, or combinations thereof, provided the camera used to monitor the monitored vessel. Responsive to determining that an event is not detected ("no" at step 520), process 500 returns to step 510 and continues to monitor the monitored vessel.

Responsive to determining that an event is detected, process 500 issues an alert (step 530), with the process terminating thereafter. The alert can be alert 422 of FIG. 4. The alert is a message, notification, alarm, or other notice to personnel process 500 that has detected activity occurring in the vicinity of a monitored vessel. The alert can be, for example, an email, a visual alarm, an audio alarm, a pop up, a text based message, or any other form of notification provided to personnel.

Figure 6:
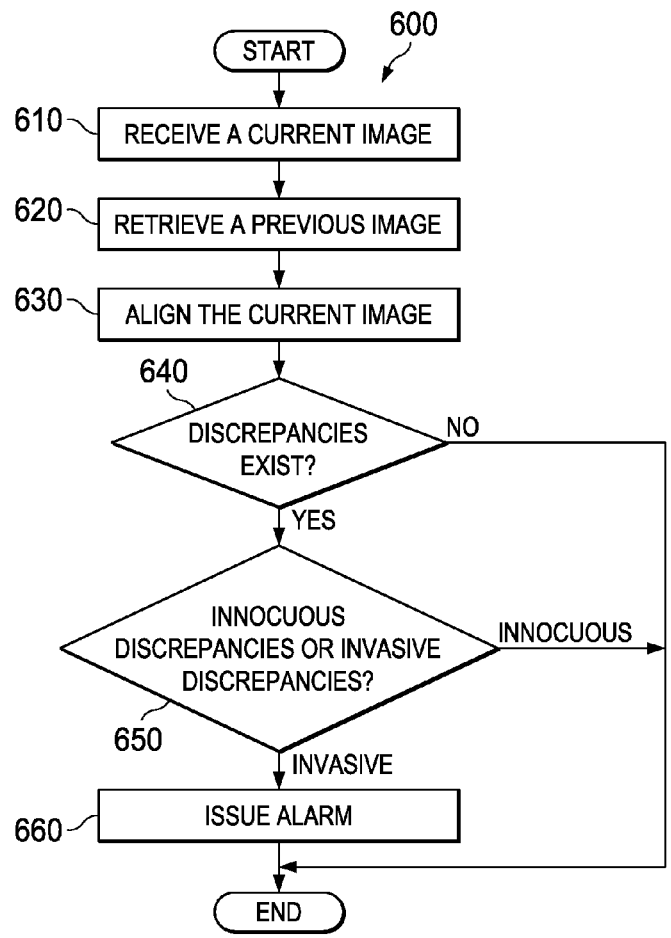
FIG. 6 is a flowchart of the processing steps for determining invasive discrepancies shown according to an illustrative embodiment.

Referring now to FIG. 6, a flowchart of the processing steps for determining invasive discrepancies is shown according to an illustrative embodiment. Process 600 is a software process executing on a software component, such as comparison engine 430 of FIG. 4.

Process 600 begins by receiving a current image (step 610). The current image can be current image 428 of FIG. 4. The current image is an image of any hidden resource within the monitored vessel taken by personnel in response to receiving an alert of activity occurring in the vicinity of a monitored vessel. The current image is an image of the contents of the monitored vessel.

Process 620 then retrieves a previous image (step 620). The previous image can be previous image 432 of FIG. 4. The previous image is an image of the contents of the monitored vessel taken prior to process 600 detecting the activity occurring in the vicinity of the monitored vessel.

Process 600 then aligns the current image (the previous image to step 630). In one illustrative embodiment, process 600 can adjust the rotational alignment, as well as a magnification level of the current image to most closely align the current image to the previous image before a comparison is made.

Process 600 then determines whether discrepancies between the two images exist (step 640). After aligning the current image with the previous image, process 600 can then perform a per pixel comparison of the current image to the previous image to determine discrepancies between the separate images. Responsive to determining that discrepancies do not exist between the two images, ("no" at step 640), the process terminates thereafter.

Responsive to determining that discrepancies exist between the two images, ("yes" at step 640), process 600 determines whether those discrepancies are innocuous discrepancies or invasive discrepancies (step 650). Innocuous discrepancies are those discrepancies between the current image and the previous image due to the differences in pixilation of the various objects within the two images. For example, after aligning the current image with the previous image, discrepancies between the two images may be present simply due to the location at which personnel was located when the current image was obtained. Similarly, various objects depicted within the current image and previous image may be provided with different levels of resolution, leading to differences in the per pixel comparison between the current image with the previous image. Discrepancies between the current image and the previous image due to resolution and alignment of the various objects within the current image and the previous image are classified as innocuous discrepancies. Responsive to determining that the discrepancies are innocuous discrepancies ("innocuous" at step 650), process 600 terminates.

Responsive to determining that the discrepancies are invasive discrepancies ("invasive" at step 650), process 600 issues an alarm (step 660), with the process terminating thereafter.

In contrast to innocuous discrepancies, after aligning the current image with the previous image, discrepancies between the two images may exist due to objects within one of the current image and the previous image that are not depicted in the other one of the current image and the previous image. Discrepancies due to these non-corresponding objects are classified as invasive discrepancies.

The alarm is an alarm, such as alarm 434 of FIG. 4. The alarm is a message, notification, alarm, or other notice to personnel that process 600 has detected an invasive discrepancy between the current image and the previous image. The alarm can be, for example, an email, a visual alarm, an audio alarm, a pop up, a text based message, or any other form of notification provided to personnel.

Upon receipt of the alarm, personnel can further investigate the invasive discrepancy. The further investigation can include searching the monitored vessel, as well as searching, detaining, or questioning any personnel connected with the activity detected occurring in the vicinity of the monitored vessel. The further investigation may also include notifying any law enforcement personnel, if, for example, but not limited to, the invasive discrepancy is identified as a theft of hidden assets from within the monitored vessel.

Thus, illustrative embodiments of the present invention provide a computer implemented method, computer system, and computer program product for monitoring resources. A monitored vessel containing hidden resources is monitored. When activity is determined as occurring within a vicinity of the monitored vessel, an alert is issued to monitoring personnel. Personnel can then obtain a current image of the hidden resource within the monitored vessel. Upon receiving the current image of the hidden resource, a previous image of the hidden resource is retrieved and discrepancies between the current image and the previous image are determined. Responsive to determining that discrepancies between the current image and the previous image exist, an alarm is issued to personnel to further investigate the discrepancy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for monitoring resources, the computer implemented method comprising:

monitoring, by a data processing system, a monitored vessel using a mounted camera that captures images of the monitored vessel, wherein the monitored vessel contains a hidden resource that is outside a field of view of the mounted camera;

determining, by the data processing system, activity occurring in a vicinity of the monitored vessel;

responsive to the data processing system determining that the activity is occurring in the vicinity of the monitored vessel, issuing, by the data processing system, an alert to personnel;

receiving, by the data processing system, a current image of the hidden resource that is outside the field of view of the mounted camera capturing images of the monitored vessel from a portable camera held by the personnel after the issuing of the alert;

retrieving, by the data processing system, a previous image of the hidden resource that is outside the field of view of the mounted camera capturing images of the monitored vessel captured prior to the issuing of the alert;

responsive to the data processing system receiving the current image of the hidden resource captured by the portable camera after the issuing of the alert and the data processing system retrieving the previous image of the hidden resource captured prior to the issuing of the alert, determining, by the data whether discrepancies exist between the current image and the previous image; and responsive to the data processing system determining that discrepancies exist between the current image and the previous image, issuing, by the data processing system, an alarm to investigate the discrepancies.

2. The computer implemented method of claim 1, further comprising:

determining, by the data processing system, whether the discrepancies between the current image of the hidden resource captured by the portable camera after the issuing of the alert and the previous image of the hidden resource captured prior to the issuing of the alert are innocuous discrepancies or invasive discrepancies; and responsive to the data processing system determining that the discrepancies between the current image of the hidden resource captured by the portable camera after the issuing of the alert and the previous image of the hidden resource captured prior to the issuing of the alert are invasive discrepancies due to hidden resource objects within one of the current image and the previous image that are not in an other one of the current image and the previous image, issuing, by the data processing system, the alarm to investigate the invasive discrepancies.

3. The computer implemented method of claim 2, further comprising:

responsive to the data processing system determining that the discrepancies between the current image of the hidden resource captured by the portable camera after the issuing of the alert and the previous image of the hidden resource captured prior to the issuing of the alert are innocuous discrepancies due to differences in pixilation of the hidden resource objects within the current image and the previous image, not issuing, by the data processing system, the alarm.

4. The computer implemented method of claim 1, wherein the alert is issued to the personnel indicating that the activity is occurring in the vicinity of the monitored vessel.

5. The computer implemented method of claim 1, wherein the monitoring, by the data processing system, of the monitored vessel comprises:
   receiving, by the data processing system, real time video, image captures, or combinations thereof, provided by the mounted camera.

6. The computer implemented method of claim 1, wherein the alert is selected from a group consisting of a message, a notification, a notice, an email, a visual alarm, an audio alarm, a pop up, and a text based message to the personnel of the activity in the vicinity of the monitored vessel, and wherein the alarm is selected from a group consisting of a message, a notification, a notice, an email, a visual alarm, an audio alarm, a pop up, and a text based message to the personnel of the discrepancies between the current image and the previous image.

7. The computer implemented method of claim 1, wherein the determining, by the data processing system, whether discrepancies exist between the current image of the hidden resource captured by the portable camera after the issuing of the alert and the previous image of the hidden resource captured prior to the issuing of the alert further comprises:
   aligning, by the data processing system, the current image of the hidden resource captured by the portable camera after the issuing of the alert and the previous image of the hidden resource captured prior to the issuing of the alert by adjusting a rotational alignment of the current image, adjusting a rotational alignment of the previous image, adjusting a magnification level of current image, adjusting a magnification level of previous image, and combinations thereof; and
   performing, by the data processing system, a per pixel comparison of the current image of the hidden resource captured by the portable camera after the issuing of the alert to the previous image of the hidden resource captured prior to the issuing of the alert to determine the discrepancies between the current image and the previous image.

* * * * *